US006600290B1

United States Patent
Niemelä

(10) Patent No.: US 6,600,290 B1
(45) Date of Patent: *Jul. 29, 2003

(54) STATOR FLUX ESTIMATE MIDPOINT CORRECTION

(75) Inventor: Markku Niemelä, Lappeenranta (FI)

(73) Assignee: ABB Oy, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 09/913,507

(22) PCT Filed: Feb. 14, 2000

(86) PCT No.: PCT/FI00/00103

§ 371 (c)(1),
(2), (4) Date: Aug. 28, 2001

(87) PCT Pub. No.: WO00/49709

PCT Pub. Date: Aug. 24, 2000

(30) Foreign Application Priority Data

Feb. 15, 1999 (FI) .................................... 990300

(51) Int. Cl.$^7$ ............................... H02P 7/64; H02P 7/36
(52) U.S. Cl. ..................... 318/727; 318/804; 318/798
(58) Field of Search ................. 318/727, 804, 318/807, 805, 811, 801, 798, 767, 799; 324/158, 772

(56) References Cited

U.S. PATENT DOCUMENTS

| 5,162,727 A | | 11/1992 | Hindsberg et al. |
| 5,371,458 A | | 12/1994 | Heikkila |
| 5,532,570 A | * | 7/1996 | Tajima et al. ............... 318/804 |
| 5,589,754 A | | 12/1996 | Heikkila |
| 5,811,957 A | * | 9/1998 | Bose et al. .................. 318/802 |
| 5,936,377 A | | 8/1999 | Blaschke et al. |
| 6,008,618 A | * | 12/1999 | Bose et al. .................. 318/811 |
| 6,242,885 B1 | * | 6/2001 | Ide et al. .................... 318/811 |
| 6,335,607 B1 | * | 1/2002 | Niemela .................... 318/798 |

FOREIGN PATENT DOCUMENTS

WO   WO 99/49564   9/1999

* cited by examiner

Primary Examiner—Robert E. Nappi
Assistant Examiner—Patrick Miller
(74) Attorney, Agent, or Firm—Dykema Gossett PLLC

(57) ABSTRACT

A method of correcting the stator flux estimate midpoint in alternating-current systems, the method comprising the step of determining a stator flux estimate ($\Psi_s$, est?). The method is characterized in steps of forming the sum of the squares of the rectangular components ($\Psi_{sx}$, est?, $\Psi_{sy}$, est?) of the stator flux estimate to obtain a reference variable (k), low-pass filtering the reference variable (k) in order to obtain a low-frequency component ($k_{filt}$) of reference variable, subtracting the low-frequency component ($k_{filt}$) from the reference variable (k) in order to obtain a difference variable (e), determining rectangular correction term components ($\Psi_{sx}$, corr?, $\Psi_{sy}$, corr?) of the stator flux estimate ($\Psi_s$, est?) by multiplying the difference variable (e) by the rectangular components ($\Psi_{sx}$, est?, $\Psi_{sy}$, est?) of the stator flux and a correction coefficient ($K_{\Psi corr}$), and forming a midpoint-corrected stator flux estimate ($\Psi_s$, fin?) by adding the correction term components to the components of the stator flux estimate.

3 Claims, 2 Drawing Sheets

US 6,600,290 B1

STATOR FLUX ESTIMATE MIDPOINT CORRECTION

BACKGROUND OF THE INVENTION

This invention relates to a method of correcting the stator flux estimate midpoint in alternating-current systems, the method comprising the step of determining a stator flux estimate.

As generally known, a stator flux estimate representing the electric state of the machine can be used in controlling alternating-current machines. The stator flux estimate is usually determined by integrating the stator voltage vector from which the resistive losses caused by the stator current have been subtracted according to equation (1)

$$\Psi_{s,est} = \int (u_s - r_{s,est} i_s) dt \quad (1)$$

Equation (1) is expressed in a stator coordinate system in which the stator voltage vector $u_s$ and stator current vector $i_s$ are combined vector variables representing the voltages and currents of all the system phases, and thus the stator flux estimate $\Psi_{s,est}$ is also a vector variable. In practice, the parameters of equation (1) contain errors. Integration cannot be performed completely without errors, either, and consequently the stator flux estimate will also be erroneous. Since the voltages and currents of alternating-current systems alternate sinusoidally, the vertex of the vectors calculated on the basis of the corresponding variables draws an origin-centred circle. Thus the flux determined on the basis of voltages and currents is described by an origin-centred circle.

The calculated stator flux estimate does not, however, remain origin-centred due to the above-mentioned error factors. Consequently, the stator flux estimate $\Psi_{s,est}$ has to be corrected by different methods before it can be utilized for the actual control.

The variable corresponding to the flux can also be determined for other alternating-current systems, e.g. for an electric network, in which case the power to be fed into the electric network can be controlled by the same principles as an alternating-current machine. In controlling the power to be fed into the network, it is also important to obtain a realistic estimate for the flux value corresponding to the network voltage.

In controlled motor drives, eccentricity of the flux estimate or the flux is usually corrected by means of a current model drawn up for the machine, in which the stator current vector determined on the basis of the alternating currents of the machine serves as the feedback variable. In synchronous machines, the measured magnetization current and the rotor position angle can also be used as the feedback variable. The current model includes all inductance and resistance parameters of the machine and any reduction coefficients, whose accuracy determines the accuracy of the flux estimate obtained from the current model. In practice, the current model is always erroneous because of inaccurate machine parameters.

The current vector and the motor model are used for calculating the stator flux of the machine, but if the inductance parameters of the motor model are erroneous, they will cause errors in angle and magnitude in the stator flux estimate. The calculated estimate can, however, be used for keeping the stator flux vector origin-centred, although it will contain other errors.

BRIEF DESCRIPTION OF THE INVENTION

The object of this invention is to provide a method with which the flux estimate can be kept origin-centred and which allows the correction of the flux midpoint in flux-controlled alternating-current systems in a more reliable a manner and by a simpler method even at low frequencies. This object is achieved by the method of the invention which is characterized in that the method also comprises the steps of forming the sum of the squares of the rectangular components of the stator flux estimate to obtain a reference variable, low-pass filtering the reference variable in order to obtain a low-frequency component of the reference variable, subtracting the low-frequency component from the reference variable in order to obtain a difference variable, determining rectangular correction term components of the stator flux estimate by multiplying the difference variable by the rectangular components of the stator flux estimate and a correction coefficient, and forming a stator flux estimate having a corrected midpoint by adding the correction term components to the components of the stator flux estimate.

The method of the invention is based on the idea that any eccentricity in the stator flux can be corrected using the sum of the squares of a the instantaneous values of the stator flux components as basis. Thus performed, the correction of the eccentricity can already be made at low frequencies. In addition, the correction method does not require information on instantaneous currents of the electrical machine, but only on the magnitude of the stator flux estimate.

The method of the invention thus provides the advantage of being simple and reliable as well as providing desired results already at very low frequencies.

BRIEF DESCRIPTION OF THE DRAWINGS

The invention will now be described in greater detail by means of preferred embodiments with reference to the accompanying drawings, in which.

DETAILED DESCRIPTION OF THE INVENTION

Figure 1:
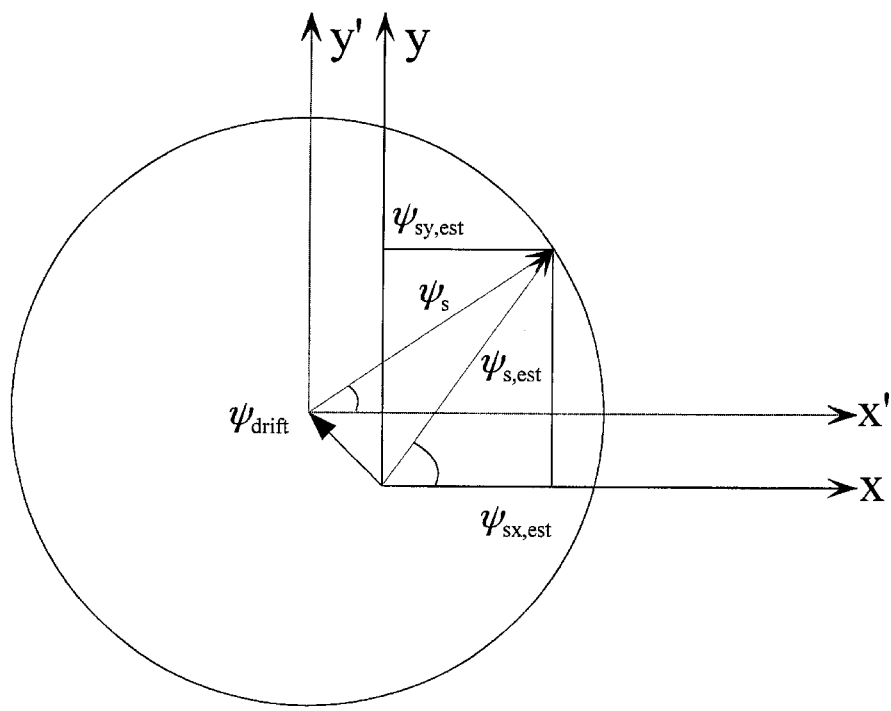
FIG. 1 shows a general presentation of an eccentric stator flux estimate.

FIG. 1 shows an eccentric stator flux estimate in which the estimate is not at the midpoint of the marked x, y coordinate system. The estimate has drifted to point $\Psi_{drift}$ which forms the origin of the x', y' coordinate system. It is, therefore, clear that, as interpreted from the x, y coordinate system, the estimates $\Psi_{sx, est}$ and $\Psi_{sy, est}$ obtained from the stator flux $\Psi_s$ do not correspond to the actual situation, and consequently the control methods of an electrical machine based on using the estimate may not control the machine in a desired manner.

Figure 2:
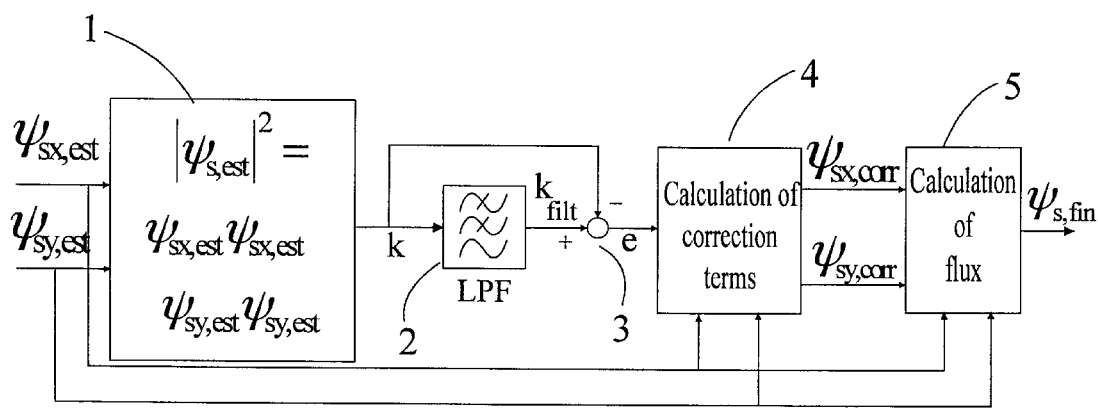
FIG. 2 shows a general block diagram of midpoint correction.

FIG. 2 shows a block diagram illustrating the method of the invention. The stator flux estimate of an alternating-current system is determined according to the method of the invention. The flux estimate can be determined by means of the integral clause in equation 1, for instance. In FIG. 2, the flux estimate $\Psi_{s, est}$ is illustrated as divided into components, whereby the x an y components $\Psi_{sx, est}$ and $\Psi_{sy, est}$ of the flux estimate are obtained. According to the invention, the sum of the squares of the rectangular components $\Psi_{sx, est}$ and $\Psi_{sy, est}$ of the stator flux estimate is calculated to obtain the reference variable k. The sum of the squares is calculated simply by means of the clause $\Psi_{sx, est}\Psi_{sx, est}+\Psi_{sy, est}\Psi_{sy, est}$ in calculation block 1 of FIG. 2. The reference variable k obtained as output of calculation block 1 is then low-pass filtered in low-pass filter block 2 to obtain the low-frequency component $k_{filt}$ of the reference variable.

The output of low-pass filter block 2 is connected to the positive input of an adding element 3. The reference variable obtained from the output of block 1 is connected to the negative input of the adding element. The adding element 3 thus calculates, according to the method, the difference between the low-frequency component $k_{filt}$ of the reference variable and the reference variable k yielding a difference variable e to the output of the adding element.

The rectangular correction term components $\Psi_{sx, corr}$, $\Psi_{sy, corr}$ of the stator flux estimate $\Psi_{s, est}$ are calculated in calculation block 4 on the basis of the difference variable e and the stator flux estimate components $\Psi_{sx, est}$, $\Psi_{sy, est}$. The correction term components are calculated according to the method by multiplying the difference variable e by the stator flux estimate components $\Psi_{sx, est}$, $\Psi_{sy, est}$ and a correction coefficient $K_{\Psi corr}$, in which case calculation block 4 executes equations $\Psi_{sx, corr}=K_{\Psi corr}$ e $\Psi_{sx, est}$ and $\Psi_{sy, corr}=K_{\Psi corr}$ e $\Psi_{sy, est}$. The correction term components obtained from the output of block 4 are then summed according to the invention with the corresponding stator flux estimate components to obtain a midpoint-corrected stator flux estimate $\Psi_{s, fin}$.

Figure 3:
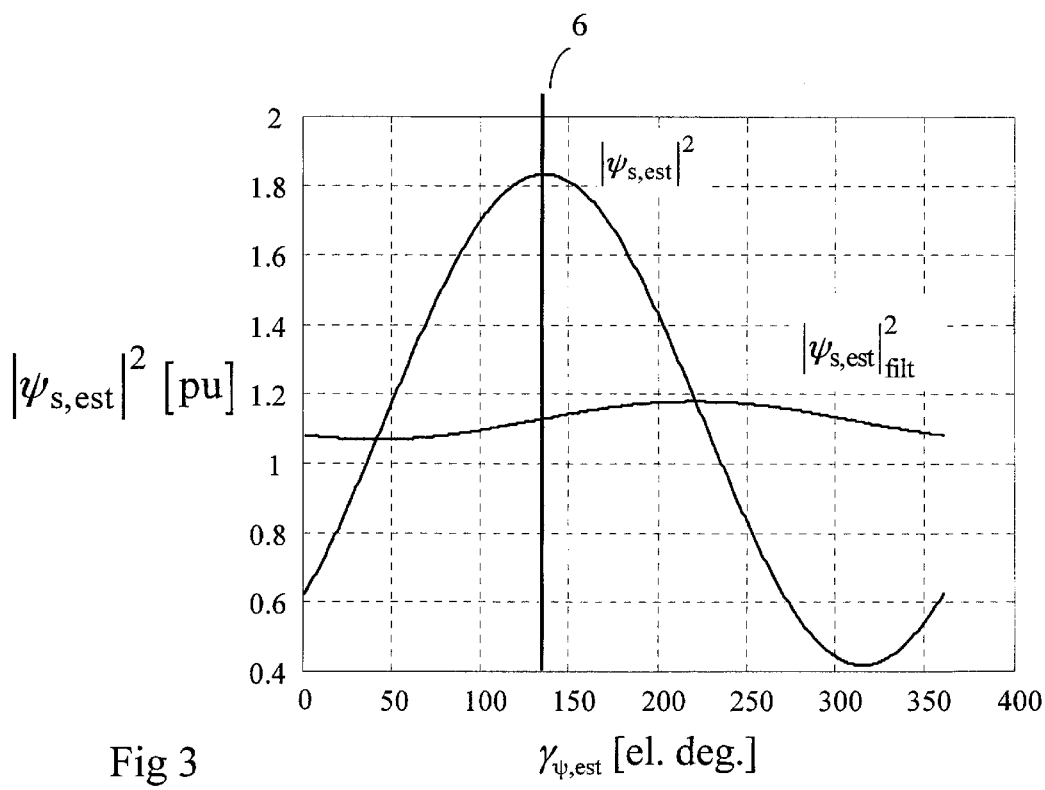
FIG. 3 shows the behaviour of the sum of the squares of stator flux components and the corresponding filtered value.

FIG. 3 shows the behaviour of the sum of the squares of the flux components and the corresponding filtered value during one electrical cycle in a case of eccentricity corresponding to FIG. 1. In FIG. 1, the stator flux midpoint has shifted in the direction of 135 electrical degrees. When comparing the drifting direction of the flux midpoint in FIG. 1 and the moment of greatest difference of the curves in FIG. 3 in electrical degrees, it can be noted that the difference between the sum of the squares and its filtered value is at its greatest at approximately 135 electrical degrees marked by a vertical bar 6 in FIG. 3. The method of the invention utilizes this difference in calculating the correction terms.

Figure 4:
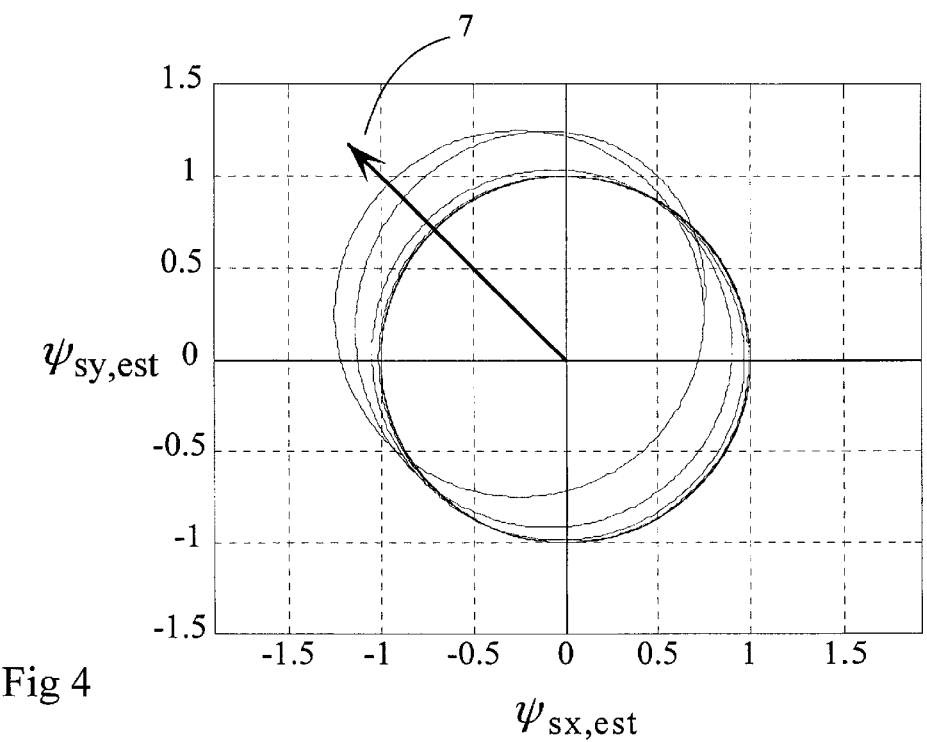
FIG. 4 shows the operation of a midpoint correction of a stator flux estimate.

FIG. 4 illustrates the elimination of the eccentricity related to FIGS. 1 and 3 when utilizing the method of the invention. The figure shows that the flux circle moves to the origin within only a few electrical cycles. The main direction of the eccentricity is marked with an arrow 7 in FIG. 4.

The magnitude of the correction coefficient $K_{\Psi corr}$ can be experimentally selected to be constant. According to an embodiment of the invention, the correction coefficient can, however, be selected according to the frequency of the alternating-current system so that the magnitude of the correction coefficient changes when the system frequency varies.

It is obvious to a person skilled in the art that as technology advances, the basic idea of the invention can be implemented in many different ways. The invention and its embodiments are thus not restricted to the examples described above, but can vary within the scope of the claims.

What is claimed is:

1. A method of correcting the stator flux estimate midpoint in alternating-current systems, the method comprising the step of determining a stator flux estimate, forming the sum of the squares of the rectangular components of the stator flux estimate to obtain a reference variable, low-pass filtering the reference variable in order to obtain a low-frequency component of the reference variable, subtracting the low-frequency component from the reference variable in order to obtain a difference variable, determining rectangular correction term components of the stator flux estimate by multiplying the difference variable by the rectangular components of the stator flux estimate and a correction coefficient, and forming a midpoint-corrected stator flux estimate by adding the correction term components to the components of the stator flux estimate.

2. A method as claimed in claim 1, wherein the correction coefficient is constant.

3. A method as claimed in claim 1, wherein the correction coefficient is proportional to the frequency of the alternating-current system.

* * * * *